Patented May 6, 1930

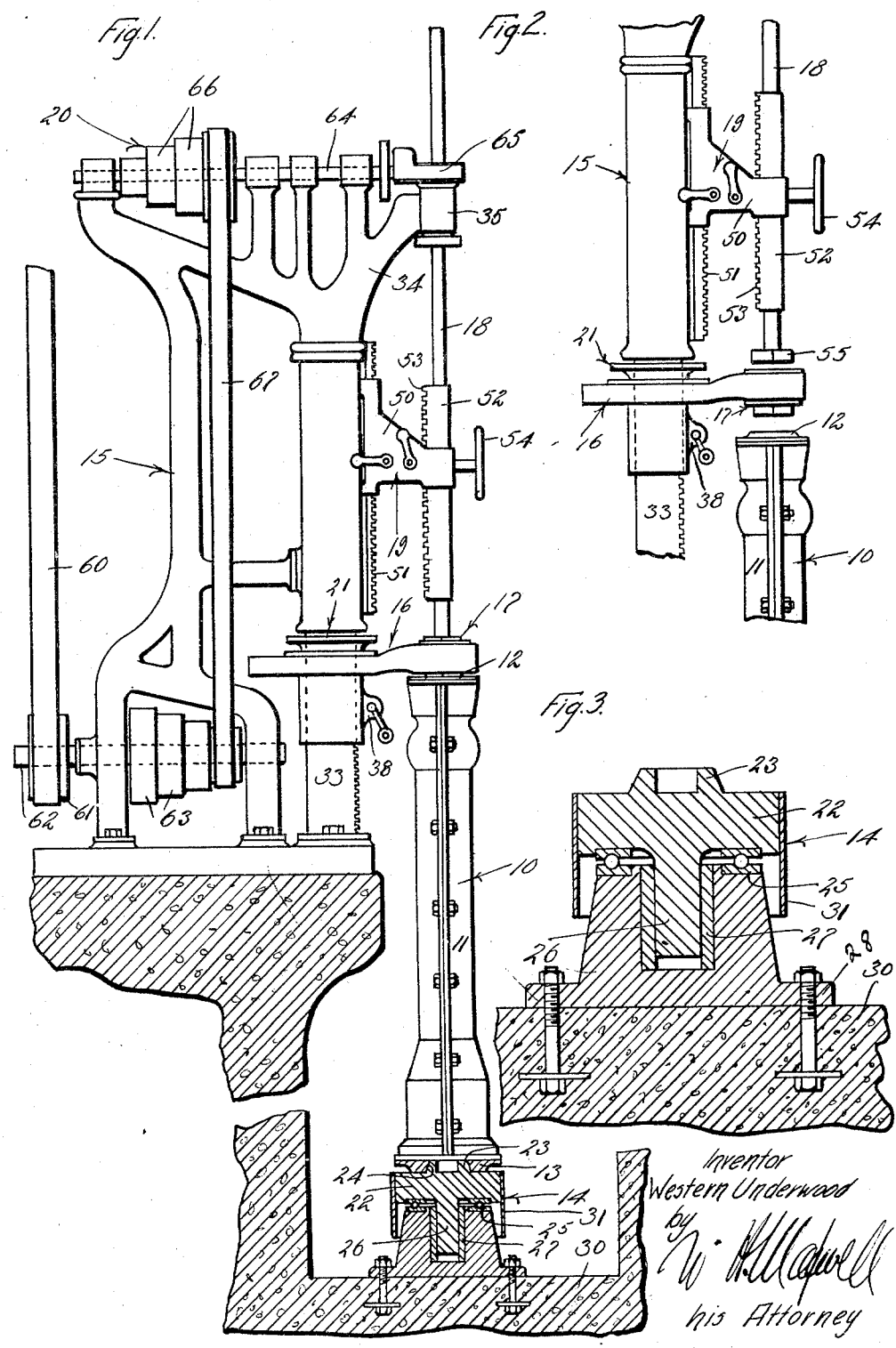

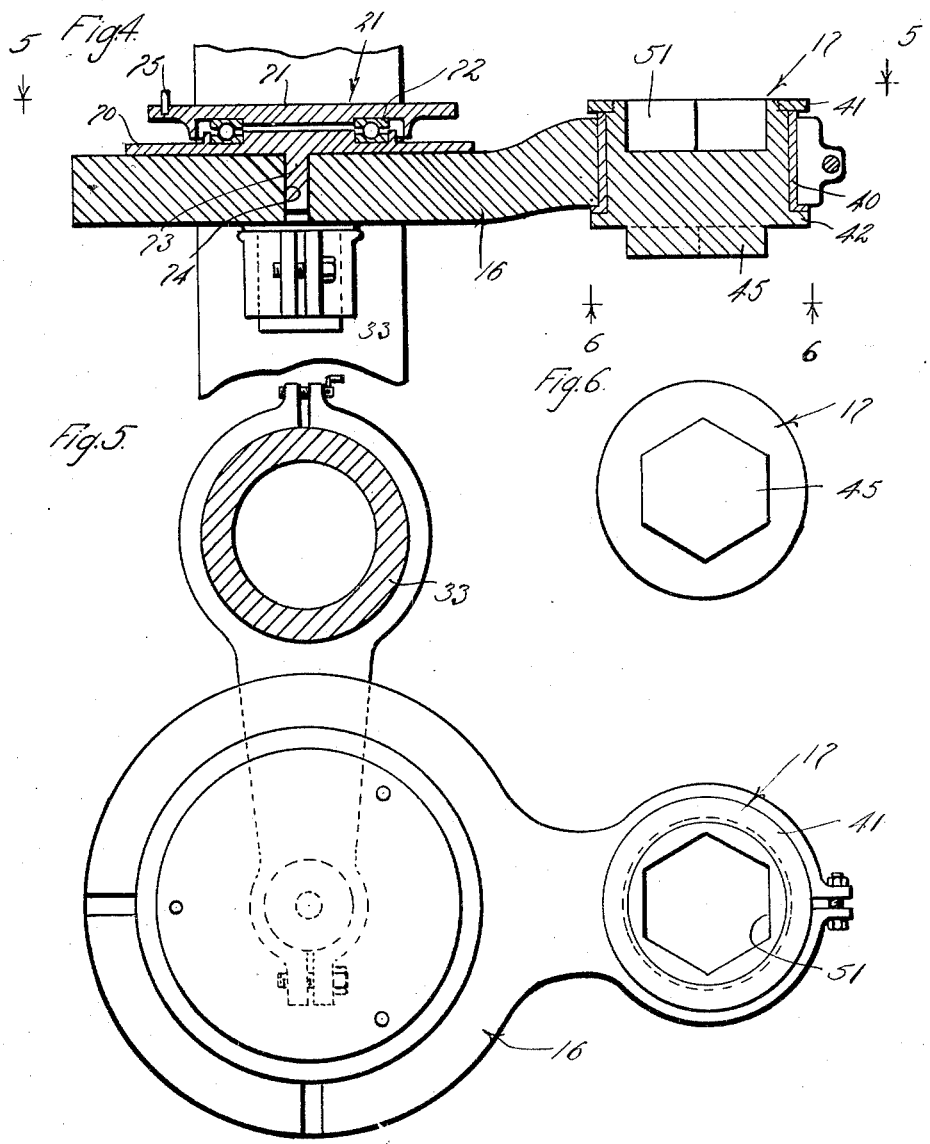

1,757,274

UNITED STATES PATENT OFFICE

WESTERN UNDERWOOD, OF SANTA MONICA, CALIFORNIA, ASSIGNOR TO LA LUX MANUFACTURING COMPANY, OF LOS ANGELES, CALIFORNIA, A CORPORATION OF CALIFORNIA

MOLD-ROTATING MACHINE

Application filed December 14, 1927. Serial No. 239,911.

This invention has to do with a mold operating machine and it is a general object of the invention to provide a practical, effective and improved machine for rotating a mold, such for instance as a post or a column mold.

Monolithic columns and posts are ordinarily formed or cast in suitable molds, it being desirable in accordance with certain methods of manufacture to spin or rotate the molds in order to obtain the desired density and molding of material being cast. Considerable difficulty has been experienced in machines for rotating molds, and those that have been in general use have handled the molds in a horizontal position. A long, heavy mold arranged in a horizontal position ordinarily requires supporting bearings intermediate at its ends, and therefore the machines that have been developed are comparatively large and complicated.

It is an object of this invention to provide a simple, inexpensive and practical machine operable to handle a mold in an upright or vertical position.

A further object of this invention is to provide a simple and practical machine for effectively supporting a mold in a vertical position and rotating it in that position.

Another object of my invention is to provide a simple, practical and effective construction for obtaining a driving connection between a suitable source of power and a mold rotatably supported in a vertical position.

Another object of this invention is to provide a machine of the character mentioned, capable of handling long, heavy molds for forming columns, or the like, and also short or small molds such as may be used in forming smaller parts.

It is a further object of this invention to provide various improvements in the construction and arrangement of parts in a machine of the type mentioned.

The many objects and features of my present invention including those above mentioned will be understood from the following detailed description of the invention, throughout which description reference is had to the accompanying drawings, in which:

Fig. 1 is a vertical view of the machine provided by this invention showing a typical post mold in operating position therein and showing certain parts of the machine in section;

Fig. 2 is a view of certain of the parts of the machine shown in Fig. 1, showing the parts separated or out of operating position;

Fig. 3 is an enlarged, detailed sectional view of the carrier provided to carry the lower end of the post mold;

Fig. 4 is an enlarged, detailed sectional view of the head of the machine showing in detail the carrier provided for handling small molds and the support for the upper end of a post mold;

Fig. 5 is a plan view of the parts shown in Fig. 4, being a view taken by line 5—5 on Fig. 4; and Fig. 6 is a view taken as indicated by line 6—6 on Fig. 4.

The machine provided by this invention is intended to handle comparatively long, heavy molds, or the like, and also smaller molds. In the drawings, I disclose a post mold 10 in connection with the machine. The post mold illustrated includes, generally, an elongate sectional body 11, and upper and lower end plates 12 and 13, respectively, on the ends of the body. My present machine is such as to require engagement with the end plates only and therefore these are the only parts of the mold that will be referred to in detail, it being understood that the other parts of the mold may be of any desired nature.

The machine includes, generally, a support or carrier 14 for the lower end of the mold, a frame 15, a head 16 carried by the frame to be adjusted vertically, a support 17 carried by the head to engage and support the upper end of the mold 10, a drive spindle 18 carried by the frame and adapted to drive the mold 10 through the support 17, means 19 for adjusting the spindle vertically, a suitable drive 20 for the spindle, a carrier 21 on the head to be positioned to support a small mold in position to be operated from the spindle, and various other parts, the details and functions of which will be hereinafter described.

The mold support or carrier 14 provided to carry the lower end of the mold 10, includes primarily a platform 22 mounted to rotate freely about a vertical axis. The platform 22 and end plate 13 on the lower end of the mold have co-operating or inter-engaging parts whereby the mold is held centrally on the platform. In the particular construction illustrated, a central projection 23 is provided on the platform to fit a corresponding central socket 24 in the end plate 13 of the mold 10. In the construction illustrated, the platform 22 is supported on a thrust bearing 25 and has a central downwardly projecting stem 26 rotatably mounted in a bearing 27 provided in a frame or base 28. The base 28 may be mounted on a foundation 30. In practice, an apron 31 is provided on the peripheral portion of the platform 22 to project downwardly therefrom over the thrust bearing 25, and thus shields and protects the bearing.

The principal or main frame 15 of the machine is mounted in a fixed position on a foundation 30. The frame 15 is located a substantial distance above the mold carrier 14 and in practice a continuous or common foundation 30 is provided for the frame and carrier 14. The main part 33 of the frame 15 is in the form of a comparatively large, rigid, vertically disposed post, on which the head 16 is mounted. The frame also includes a bracket 34, carrying a bearing 35 for the drive spindle 18, and various other parts, as will be hereinafter described.

The head 16 is mounted on the post part 33 of frame so that it can be swung or rotated about the axis of the post and can be operated or adjusted vertically. The head is a horizontally disposed structure projecting a substantial distance from the post 33, so that it can be moved to position under the vertically disposed drive spindle 18. The head 16 forms a mounting for the small mold carrier 21 and also supports the carrier 17 for the upper end of the post mold. The axes of the small mold carrier 21 and the post mold carrier 17 are located the same distance from the central axis of the post 33 of the frame, this distance corresponding to the spacing of the axle of the spindle 18 from the axis of the post 33. With this arrangement, the head can be rotated or positioned to bring either the small mold carrier 21 or the post mold carrier 17 into line with the drive spindle 18. The head 18 is adapted to be adjusted vertically on the post 33 through a suitable rack and pinion mechanism 38.

The post mold carrier 17 supported by the head 16 of the machine is rotatably mounted in a vertically disposed bearing 40 provided in the head 16. The carrier 17 extends through the bearing and is provided at its ends with flanges 41 and 42 which retain it in the bearing 40. The lower end of the carrier is provided with means for co-operating with the upper end plate 12 of the mold to support the mold and provide a driving engagement between the carrier and the mold. In the particular construction shown, the lower end of the carrier 17 is provided with a downwardly extending projection 45 to fit a corresponding socket provided in the end plate 12 of the mold. When the parts are arranged so that the projection 45 extends into the socket of the mold plate 12, the upper end of the mold is supported by the carrier. To provide the desired driving connection between the carrier 17 and the mold, the projection 45 is made to fit the socket in the plate 12 so that it cannot rotate therein. In the preferred construction, the projection 45 and its cooperating socket are made polygonal in cross-sectional configuration. The mold being in place on the bottom carrier 14, the projection 45 is operated into and out of engagement with the socket plate 12 by operating or adjusting the head 16 vertically through the mechanism 38. It will be apparent that the vertical adjustability of the head 16 allows the machine to accommodate molds of various lengths. It is also to be understood that the bottom carrier 14 is arranged in vertical alignment with the spindle 18 so that the mold is held in vertical position when the parts are arranged as shown in Fig. 1.

The drive spindle 18 is carried by bearing 35 and the adjusting means 19 so that it is vertically disposed and in vertical alignment with the bottom mold carrier 14. The adjusting means 19, whereby the spindle 18 can be adjusted vertically, includes a bracket 50 carried by the upper end portion of the frame post 33 to be adjustable vertically through a rack 51. The bracket 50 carries a sleeve 52 in which the spindle 18 is mounted for rotation, the sleeve being vertically adjustable with reference to the bracket through a rack 53. A suitable hand wheel 54 is provided for operating the sleeve vertically with reference to the bracket. It is to be understood that any suitable rack and mechanisms, or the like, may be provided between the bracket and post 33 and between the bracket and sleeve 52. My invention provides for establishing a driving connection between the spindle 18 and the post carrier 17 or a small mold on the carrier 21. In accordance with my invention, this driving connection is established through suitable meshing or inter-engaging parts on the members.

In the case illustrated, I have disclosed a drive head 55 on the lower end of the spindle to fit or co-operate with a suitable socket 81 provided in the upper end of the carrier 17. It will be understood that a similar socket may be provided in a mold that may be mounted on the carrier 21. The head 55 fits the socket 81 to lock the spindle 18 against rotation with reference to the carrier 17. In the preferred construction, the head 55 and socket 51 are made polygonal in cross-section configuration as shown in the drawing. When the mold has been supported in the machine by setting the carrier 17 in position to hold the upper end of the mold, the spindle is lowered so that its head 55 extends into socket 81.

The spindle 18 may be operated through any suitable drive 20. In the drawings, I have shown an arrangement whereby the spindle 18 can be operated at various speeds from a drive belt 60. The belt 60 runs over a pulley 61 to operate a shaft 62 carrying a plurality of drive pulleys of various sizes. A countershaft 64 is mounted in the frame and is connected with the spindle 18 through a gear-drive 65. The countershaft carries a plurality of pulleys 66 of various sizes. A drive belt 67 is provided so that it can be arranged on one of the pulleys 63 to drive one of the pulleys 66 and thus establish a drive connection between the shaft 62 and the shaft 64.

The small mold carrier 21 above referred to is preferably detachable from the head 16. In the construction shown, the carrier 21 includes a base plate 70 to be mounted on the head 16 and a platform 71 supported on the base through a suitable bearing 72. A center pin 73 is provided on the base plate 70 to fit a suitable socket 74 provided in the head 16. The platform 71 may be provided with means such as pins 75, or the like, for holding a small mold or other object to be driven in the machine. When it is desired to operate a small mold or the like, it is mounted on the pulatform 71 and the head 16 swung so that the carrier 21 is in vertical alignment with the spindle 18. Spindle 18 is then lowered into driving engagement with the mold on the carrier 21.

Having described only a typical preferred form of my invention, I do not wish to limit myself to the specific details set forth, but wish to reserve to myself any changes or variations that may appear to those skilled in the art or fall within the scope of the following claims.

Having described my invention, I claim:—

1. A mold operating machine including a lower mold carrier for the lower end of the mold and having a vertical axis of rotation, a vertical drive spindle above and concentric with said carrier, and an upper mold carrier for the upper end of the mold and operable into and out of alinement with the lower carrier and spindle.

2. A mold operating machine including a lower mold carrier for the lower end of the mold and having a vertical axis of rotation, a top mold carrier operable vertically into and out of engagement with the mold, and a vertical drive spindle in line with the lower mold carrier.

3. A mold operating machine including a lower mold carrier for the lower end of the mold and having a vertical axis of rotation, a top mold carrier operable vertically into and out of engagement with the mold and operable horizontally into and out of line with the lower carrier, and a vertical drive spindle in line with the lower mold carrier.

4. A mold operating machine including a lower mold carrier for the lower end of the mold and having a vertical axis of rotation, a top mold carrier operable vertically into and out of supporting and driving engagement with the mold, and a vertical drive spindle operable vertically into and out of driving engagement with the top carrier.

5. A mold operating machine including a lower mold carrier for the lower end of the mold and having a vertical axis of rotation, the carrier including a mold supporting platform with a part for holding the mold centrally and a bearing supporting the platform on a vertical axis, a vertical drive spindle above and concentric with said carrier, and an upper mold carrier for the upper end of the mold and operable into and out of alignment with the lower carrier and spindle.

6. A mold operating machine including a support for the lower end of the mold, a carrier arranged above the support and rotatable about a vertical axis, the carrier having a part for holding and driving the mold through its upper end, and a vertical drive spindle above the carrier and cooperating with the carrier to drive it.

7. A mold operating machine including a support for the lower end of the mold, a vertically adjustable carrier arranged above the support and rotatable about a vertical axis, the carrier having a part for holding and driving the mold through its upper end, and a vertically adjustable vertical drive spindle above the carrier and cooperating with the carrier to drive it.

8. A mold operating machine including a mounting for rotatably supporting the lower end of a mold, a drive spindle spaced above and located in line with the mounting, a head movable horizontally, a carrier on the head to be positioned in line with the spindle to hold the upper end of a mold, and a rotatable mold carrying platform carried on the head to be positioned in line with the spindle.

9. A mold operating machine including a mounting for rotatably supporting the lower end of a mold, a drive spindle spaced above and located in line with the mounting, a head movable horizontally, means for adjusting the head vertically, a carrier on the head to be positioned in line with the spindle to hold the upper end of a mold, and a rotatable mold carrying platform carried on the head to be positioned in line with the spindle.

10. A mold operating machine including a mounting for rotatably supporting the lower end of a mold, a drive spindle spaced above and located in line with the mounting, a head movable horizontally, means for adjusting the head vertically, means for adjusting the spindle vertically, a carrier on the head to be positioned in line with the spindle to hold the upper end of a mold, and a rotatable mold carrying platform carried on the head to be positioned in line with the spindle.

In witness that I claim the foregoing I have hereunto subscribed my name this 6th day of December, 1927.

WESTERN UNDERWOOD.